US010769813B2

(12) United States Patent
Kuehnle et al.

(10) Patent No.: US 10,769,813 B2
(45) Date of Patent: Sep. 8, 2020

(54) APPARATUS AND METHOD FOR CALIBRATING SURROUND-VIEW CAMERA SYSTEMS

(71) Applicant: Bendix Commercial Vehicle Systems, LLC, Elyria, OH (US)

(72) Inventors: Andreas U. Kuehnle, Villa Park, CA (US); Hans M. Molin, Mission Viejo, CA (US); Travis G. Ramler, Irvine, CA (US); Jeffrey R. Coleman, Santa Ana, CA (US); Cathy L. Boon, Orange, CA (US); Zheng Li, Irvine, CA (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 16/114,706

(22) Filed: Aug. 28, 2018

(65) Prior Publication Data
US 2020/0074680 A1 Mar. 5, 2020

(51) Int. Cl.
*H04N 7/18* (2006.01)
*G06T 7/80* (2017.01)
(Continued)

(52) U.S. Cl.
CPC ............ *G06T 7/80* (2017.01); *G06T 7/55* (2017.01); *H04N 13/282* (2018.05); *H04N 13/351* (2018.05); *G06T 2207/30208* (2013.01)

(58) Field of Classification Search
CPC ... G06T 7/80; G06T 7/55; G06T 2207/30208; H04N 13/351; H04N 13/282
(Continued)

(56) References Cited

U.S. PATENT DOCUMENTS

| 7,949,486 B2 | 5/2011 | Denny et al. |
| 8,094,012 B1 | 1/2012 | Tran et al. |

(Continued)

FOREIGN PATENT DOCUMENTS

| CN | 102592454 A | 7/2012 |
| CN | 203423764 U | 2/2014 |

(Continued)

OTHER PUBLICATIONS

Bodis-Szomoru et al., "A Far-Range Off-line Camera Calibration Method for Stereo Lane Detection Systems", Instrumentation and Measurement Technology Conference—IMTC, 2007, pp. 1-6 (six (6) pages.
(Continued)

*Primary Examiner* — Shan E Elahi
(74) *Attorney, Agent, or Firm* — Crowell & Morning LLP

(57) ABSTRACT

A calibration apparatus and method are provided for a surround-view camera system having a plurality of cameras mounted to an object (e.g., a vehicle). A plurality of markers are arbitrarily placed around the object and configured to measure a plurality of distances between one another. The markers preferably include a rangefinder to measure distances. From at least one image from one or more cameras, a controller is configured to visually identify at least two markers which define a coordinate system. Based on the measured plurality of distances between markers and the visually identified markers, the controller generates calibration information as an output, preferably saved in the form of a look-up table, which will be retrieved and used when a display device generates a bird's-eye view for a viewer. Additionally, a marker that is part of the calibration apparatus is provided.

28 Claims, 13 Drawing Sheets

(51) Int. Cl.
*G06T 7/55* (2017.01)
*H04N 13/351* (2018.01)
*H04N 13/282* (2018.01)

(58) Field of Classification Search
USPC .......................................................... 348/36
See application file for complete search history.

(56) References Cited

U.S. PATENT DOCUMENTS

| | | | |
|---|---|---|---|
| 8,502,860 | B2 | 8/2013 | Demirdjian |
| 9,972,212 | B1* | 5/2018 | Sperindeo ............ G08G 5/0069 |
| 9,978,146 | B2* | 5/2018 | Hedi ......................... G06T 7/80 |
| 2010/0002078 | A1 | 1/2010 | Ito |
| 2010/0245576 | A1 | 9/2010 | Inui et al. |
| 2011/0102583 | A1 | 5/2011 | Kinzalow |
| 2012/0287232 | A1 | 11/2012 | Natroshvili et al. |
| 2013/0120575 | A1 | 5/2013 | Byun et al. |
| 2013/0293717 | A1 | 11/2013 | Zhang et al. |
| 2014/0200759 | A1 | 7/2014 | Lu et al. |
| 2014/0320658 | A1* | 10/2014 | Pliefke ...................... G06T 7/80 348/148 |
| 2015/0049193 | A1 | 2/2015 | Gupta et al. |
| 2015/0097937 | A1 | 4/2015 | Kord |
| 2015/0254853 | A1 | 9/2015 | Tanaka et al. |
| 2016/0088287 | A1 | 3/2016 | Sadi et al. |
| 2016/0253795 | A1 | 9/2016 | Cole et al. |
| 2016/0343136 | A1* | 11/2016 | Heidi ........................ G06T 7/80 |
| 2017/0272726 | A1 | 9/2017 | Ovsiannikov |
| 2017/0277961 | A1 | 9/2017 | Kuehnle |
| 2017/0374340 | A1* | 12/2017 | Pflug ...................... G06T 15/00 |
| 2018/0281698 | A1* | 10/2018 | Tang ......................... G06T 7/80 |

FOREIGN PATENT DOCUMENTS

| | | |
|---|---|---|
| CN | 104008548 A | 8/2014 |
| EP | 2 757 768 A1 | 7/2014 |
| EP | 2 848 486 A1 | 3/2015 |
| JP | 2006-135621 A | 5/2006 |
| JP | 2007-256030 A | 10/2007 |
| JP | 2007-261463 A | 10/2007 |
| JP | 2007-274564 A | 10/2007 |
| JP | 2014-174067 A | 9/2014 |

OTHER PUBLICATIONS

"What are the black and white circular patterns on the Curiosity rover?" Space Exploration Beta, edited Dec. 2, 2013, https://space.stackexchange.com/questions/2985/what-are-the-black-and-white-circular-patterns-on-the-curiosity-rover, (one (1) page).

International Search Report (PCT/ISA/220 and PCT/ISA/210) issued in PCT Application No. PCT/US19/47461 dated Nov. 12, 2019 (three (3) pages).

Written Opinion (PCT/ISA/237) issued in PCT Application No. PCT/US19/47461 dated Nov. 12, 2019 (eight (8) pages).

* cited by examiner

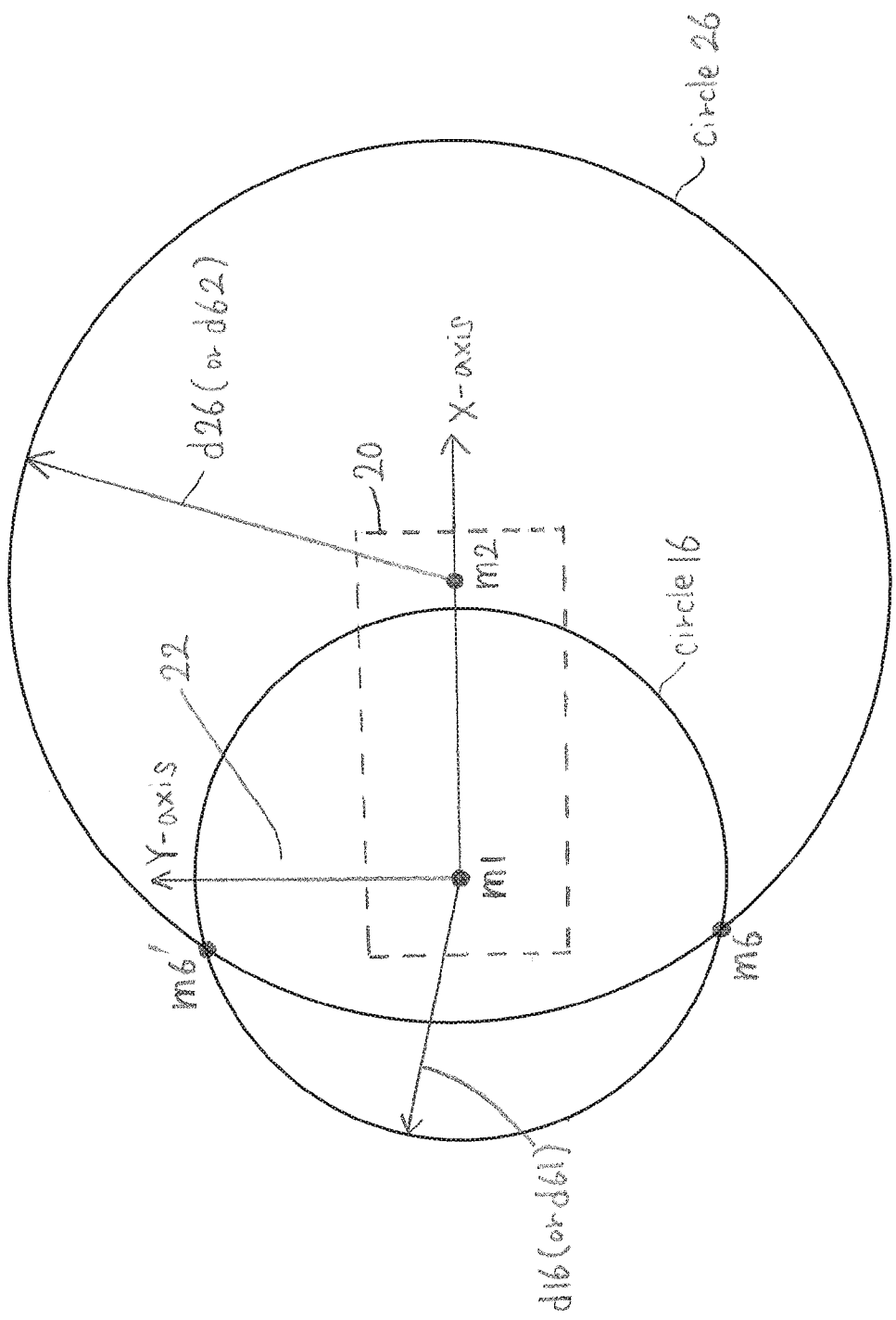

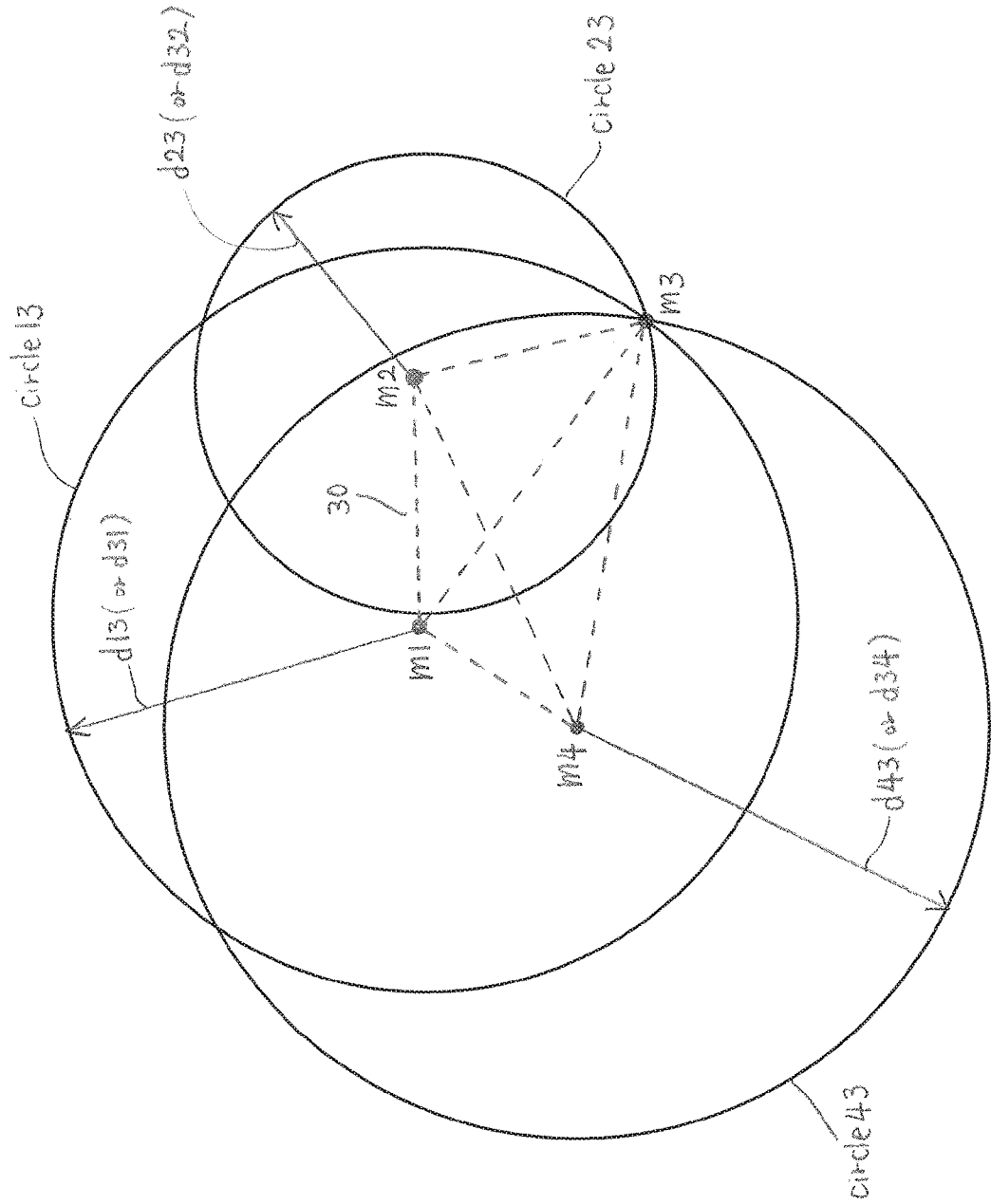

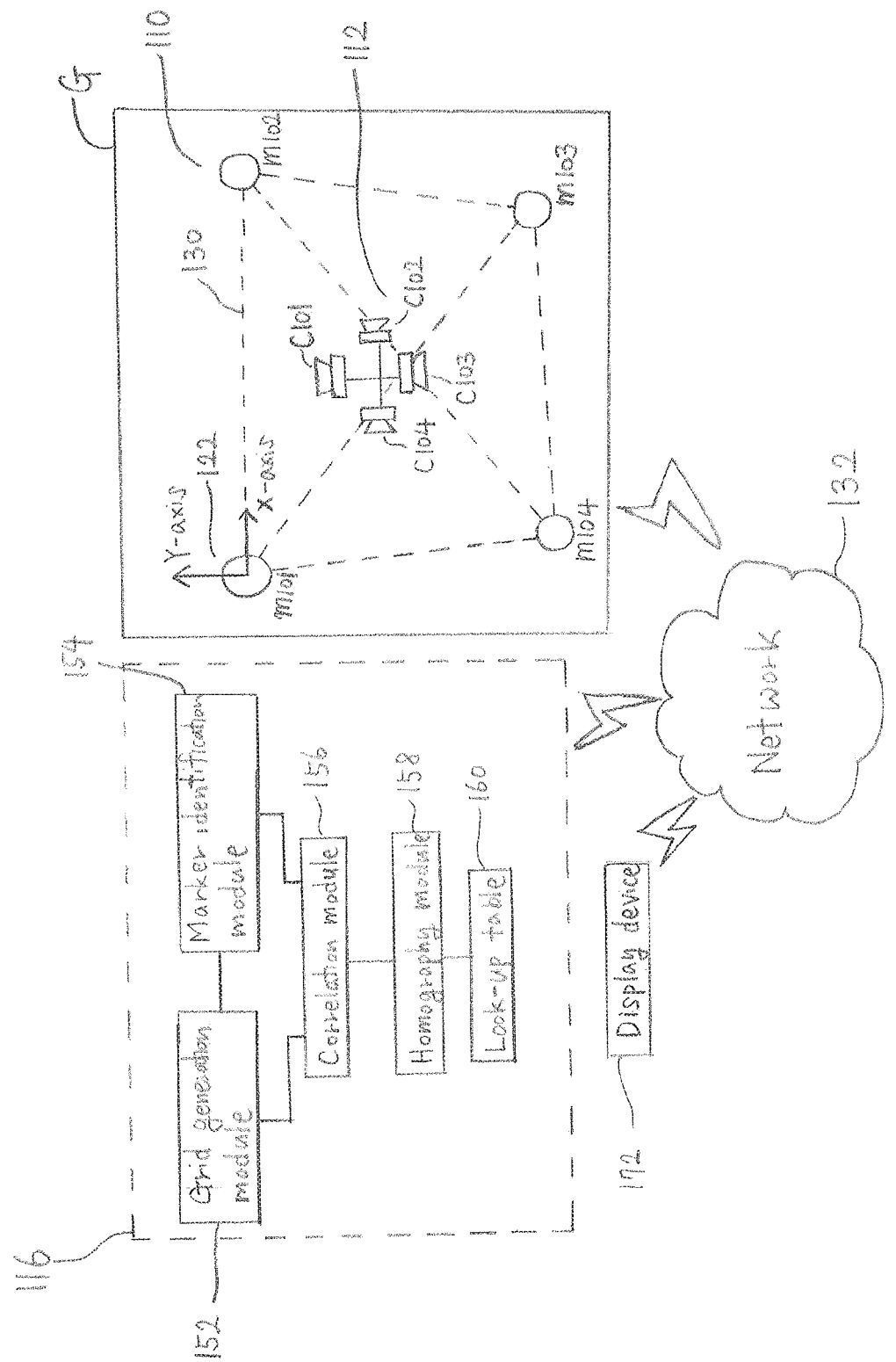

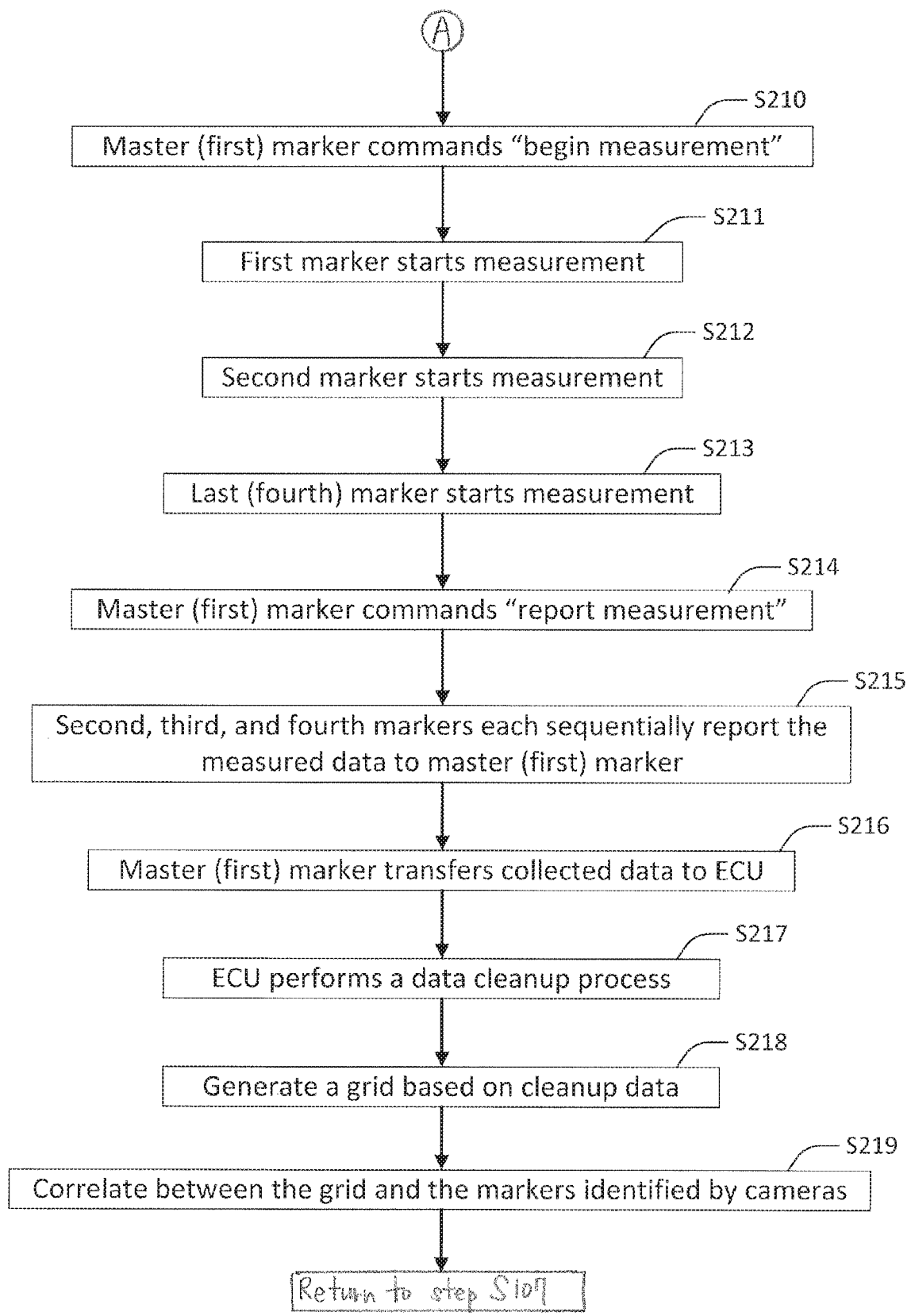

APPARATUS AND METHOD FOR CALIBRATING SURROUND-VIEW CAMERA SYSTEMS

BACKGROUND AND SUMMARY OF THE INVENTION

The present application relates to an apparatus and method for calibrating surround-view camera systems, for example, to an apparatus and method for calibrating vehicular surround-view camera systems.

Surround-view camera systems produce a bird's-eye view of the scene around a vehicle using one or more cameras. This bird's-eye view aids the driver in maneuvering the vehicle. In general, the surround-view camera calibration process "stitches" the adjacent images from adjacent cameras together so that common elements in the separate images directly overlap with each other to provide a desired view.

The calibration stage for these surround-view camera systems typically requires associating marker locations, seen in an image taken by each camera, with the actual location of these markers on the ground. For this purpose, the markers need to be placed at precise locations on the ground (e.g., precise (x, y) position of the marker on the ground). However, conventional methods of measuring the actual ground location of the markers involve long and painstaking labor, and are often prone to human error, which can lead to less accurate calibration results. In particular, this room for human error during the calibration process becomes greater as the size of the vehicle becomes bigger (e.g., trailer, bus, etc.).

In view of the foregoing, it is an objective of the present invention to provide new apparatuses and methods that render surround-view camera calibration processes less time-consuming, less labor-intensive, less prone to human error, and easier to set up.

In accordance with one aspect of the present invention, a calibration apparatus is provided for a surround-view camera system having a plurality of cameras mounted to an object. The calibration apparatus includes a plurality of markers that are arbitrarily placed in an area around the object and configured to measure a plurality of distances between one another. The calibration apparatus includes a controller which is configured to visually identify two or more of the markers from at least one image of the cameras. The controller generates calibration information based on the measured plurality of distances and the visually identified markers. The controller is preferably mounted on the object, but may be located remotely from the object.

Preferably, the controller visually identifies two or more markers via a visually distinctive characteristic on a corresponding marker. The visually distinctive characteristic may be uniquely associated with the corresponding marker and be, for example, a shape, a color, a texture, a size, a pattern and/or a reflectivity. The markers may communicate with other markers or the controller, and may include a unique identification code such that the other markers or the controller is able to identify which marker is communicating. A hierarchy may exist for the plurality of markers, for example, where a marker functions as a master marker with respect to the rest of markers which are slave markers. The master marker may perform a data cleanup process on the received measured distances before transmitting to the controller.

In accordance with another aspect of the present invention, a marker is provided, which is to be arbitrarily placed in an area to measure a distance between itself and another marker that is also arbitrarily placed in the area. The marker includes a rangefinder that is capable of measuring a distance between the marker and another marker. The marker further includes a visually distinctive characteristic thereon via which the marker is visually identified.

Preferably, the center of the visually distinctive characteristic coincides with the center of the marker. The marker or a portion of the marker may be capable of being pivotably or tiltably adjusted such that the visually distinctive characteristic is readily observable from an observing direction. The marker preferably includes a transmitter and a receiver, thus it is capable of communicating the measured distance with another marker or a controller via the transmitter and/or the receiver. The marker's body is preferably of radially symmetrical construction. The marker's body may include at least one reflective surface that reflects a light pulse from another marker. The body may include a stepped portion such that the body provides at least two reflective surfaces having different radii relative to a center line of the body. Preferably, the differential value of the different radii is uniquely associated with the marker such that the differential value is used to identify the marker.

In accordance with another aspect of the present invention, a method is provided for calibrating a surround-view camera system having a plurality of cameras mounted to an object. The method comprises arbitrarily placing a plurality of markers in the area around the object, having the plurality of markers measure distances between one another, visually identifying two or more of the plurality of markers from at least one image of the plurality of cameras; and generating calibration information based on the measured plurality of distances and the visually identified markers from the at least one image of the plurality of cameras.

In accordance with another aspect of the present invention, an object equipped with a surround-view camera system having a plurality of cameras mounted to the object is provided. The surround-view camera system is calibrated via a calibration apparatus provided in the present application. The object is preferably a vehicle.

Other objects, advantages and novel features of the present invention will become apparent from the following detailed description of the invention when considered in conjunction with the accompanying drawings.

BRIEF DESCRIPTION OF THE DRAWINGS

FIG. 2A is a plan view illustrating a coordinate system defined by the calibration apparatus.

FIG. 3B is a schematic view of the alternative calibration apparatus illustrating how the actual location of a marker is determined.

FIG. 7 is a schematic illustration of a calibration process in accordance with an embodiment of the present application.

FIGS. 9-10 are a flow chart that shows another calibration process in accordance with an embodiment of the present invention.

DETAILED DESCRIPTION OF THE DRAWINGS

Figure 1A:
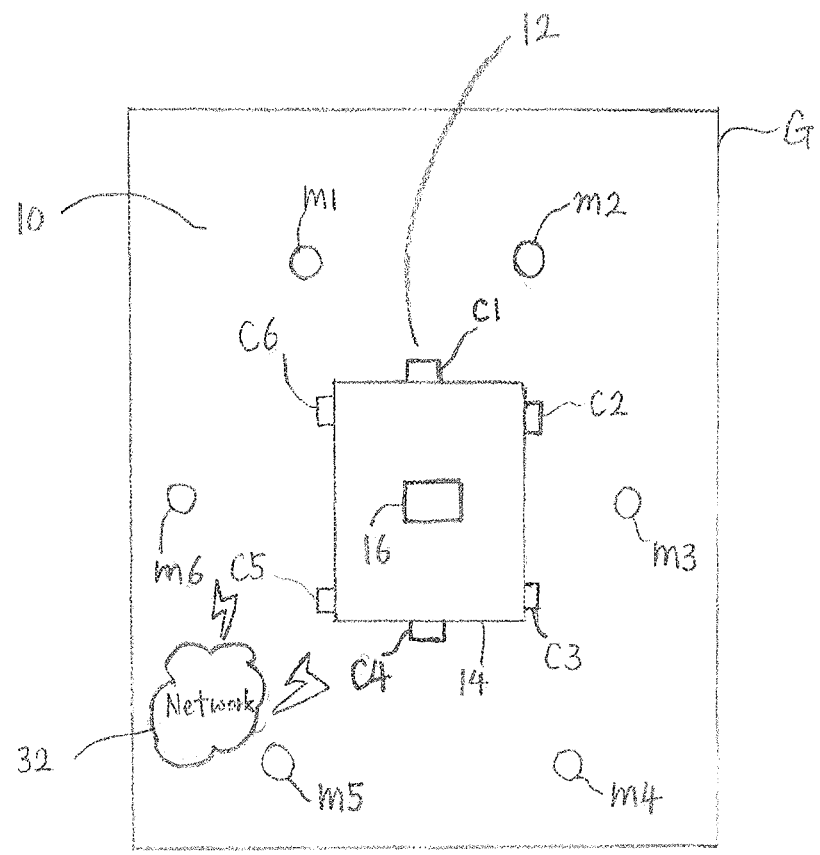
FIG. 1A is a schematic illustration of a calibration apparatus for a surround-view camera system in accordance with an embodiment of the present application.

FIG. 1A is a schematic illustration of a calibration apparatus 10 for a surround-view camera system 12. In this embodiment, the surround-view camera system 12 is mounted on a vehicle 14 (e.g., trailer, bus, van, passenger car, etc.). The surround-view camera system 12 produces one or more types of information regarding vehicle surroundings (e.g., views, images, object recognition, etc.). In particular, the surround-view camera system 12 produces a continuous bird's-eye view image of the scene around the vehicle 14 using a plurality of cameras (c1-c6). This bird's-eye view image can aid the driver in maneuvering the vehicle 14 in various ways (e.g., parking, reversing maneuver, etc.).

A bird's-eye view image mentioned in the present application refers to an image (or a view) that is produced by a single camera or by joining images taken by cameras installed on an object (e.g., a vehicle) into one image and processing the image.

As shown in FIG. 1A, to calibrate the surround-view camera system 12 mounted on the vehicle 14, the vehicle 14 is placed on an area (or calibration area) G, preferably a flat ground (or a ground plane). A plurality of markers (or calibration markers) (m1-m6) are also placed in the area G surrounding the vehicle 14. In the embodiment shown in FIG. 1A, six markers (m1-m6) are provided around the vehicle 14 that is equipped with the surround-view camera system 12 having six cameras (c1-c6). However, the number of cameras and the number of markers can vary depending on, for example, the type of vehicle, camera system, etc.

Figure 1B:
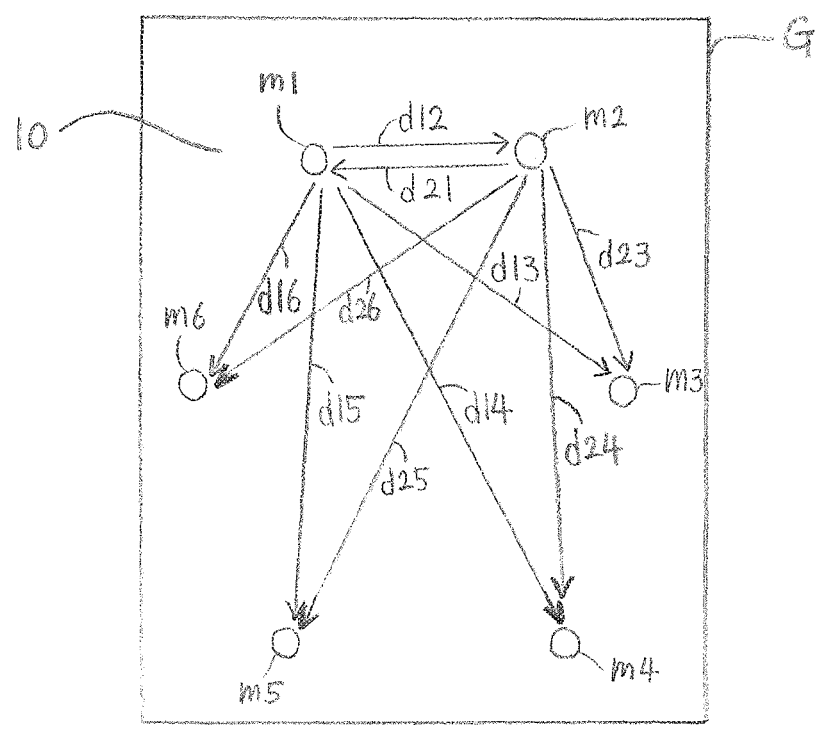
FIG. 1B is a schematic illustration of the calibration apparatus in which a plurality of markers measure distances between one another.

In one embodiment of the invention, one or more markers, preferably all of the markers (m1-m6), are configured to measure distances between one another. For example, as shown in FIG. 1B, the marker 1 (m1) is configured to measure the distance (d12) between the marker 1 (m1) and the marker 2 (m2). Further, the marker 1 (m1) is preferably configured to measure the distance (d13) between the marker 1 (m1) and the marker 3 (m3), and other distances (d14, d15, d16) with other markers (m4, m5, m6). Similarly, the marker 2 (m2) is configured to measure the distance (d21) between the marker 2 (m2) and the marker 1 (m1). Further, the marker 2 (m2) is preferably configured to measure the distance (d23) between the marker 2 (m2) and the marker 3 (m3), and other distances (d24, d25, d26) with other markers (m4, m5, m6). In a similar manner, the remaining markers (m3, m4, m5, m6) each are preferably configured to measure distances with other markers (not shown in FIG. 1B).

In one embodiment, one or more markers (m1-m6) may include a rangefinder that is capable of measuring a distance between itself and its target. Such a rangefinder may employ active range-finding methods such as laser, radar, sonar, lidar, ultrasonic range-finding, etc. Preferably, one or more markers (m1-m6) are an optical transceiver that transmits a light pulse to a target and receives a reflected light pulse from the target such as a laser rangefinder. A common form of laser rangefinder operates, for example, according to the time-of-flight measurement principle by sending a laser pulse in a narrow beam towards its target and measuring the time taken by the pulse to be reflected off the target and returned to the sender. Various types of rangefinders are known to those skilled in the art, and thus detailed descriptions are omitted for brevity.

Referring back to FIG. 1A, the distances measured by each marker (m1-m6) are transmitted to a controller or an electronic control unit (ECU) 16 via a communication network 32. The ECU 16 is part of the calibration apparatus 10. In a preferred embodiment, one or more markers communicate data (or other signals) with the ECU 16 wirelessly according to one or more suitable wireless protocols (e.g., WiMAX), including but not limited to, any short range wireless communication (SRWC) such as Wi-Fi/GPRS (3G/4G), Bluetooth, other Wi-Fi standards such as ZigBee®, wireless infrared transmission, or various combinations thereof, etc. In other embodiments, both the markers and the ECU 16 may interface with the vehicle's controller area network (CAN BUS) or other vehicle communication BUS, and may communicate with one another via that BUS. In addition, one or more markers may communicate data (or other signals) with one another via one or more suitable wireless protocols, such as those described above. Alternatively, one or more markers and the ECU 16 may communicate via any types of wired communication (e.g., via cables) or manual communication (e.g., via a USB drive). Similarly, one or more cameras (c1-c6) are arranged to communicate data (or other signals) with the ECU 16 via the communication network 32, which can be one of wireless, wired, manual communication, or any combination thereof, as described above.

The controller or the ECU 16 may be implemented by software, hardware, or a combination thereof. The ECU 16 may include a microprocessor or central processing unit (CPU) in communication with various types of non-transitory computer readable storage devices or media. Non-transitory computer readable storage devices or media may include volatile and nonvolatile storage in read-only memory (ROM) and random-access memory (RAM), for example. Computer-readable storage devices or media may be implemented using any of a number of memory devices such as PROMs (programmable read-only memory), EPROMs (electrically PROM), EEPROMs (electrically erasable PROM), flash memory, or any other electric, electronic, magnetic, optical, or combination memory devices capable of storing data, some of which represent executable instructions, used by the ECU 16.

The ECU 16 which is part of the calibration apparatus 10 may be embedded in the system of the vehicle 14, detachably mountable (e.g., portable system) to the system of the vehicle 14, or separately provided apart from the system of the vehicle 14. Further, various modules (e.g., see FIG. 7) that may be included in the ECU 16 can belong to one integrated system or can be a group of fragmented modules that are communicable via the network 32. Each module may be based on software, hardware, or a combination of both.

In the embodiment shown in FIG. 1A, the surround-view camera system 12 includes a total of six cameras (c1-c6). Preferably, cameras are mounted on the vehicle in such a way that any point in the peripheral area of the vehicle is within the field of view (FOV) of at least one camera. However, the surround-view camera system of the present invention is not limited to such six-camera arrangement. The surround-view camera system of the present invention may include any number of cameras, preferably at least four cameras. Alternatively, the surround-view camera system may have less than four cameras if the system is required to cover only a partial area of the vehicle's surroundings.

Unlike conventional calibration systems which require markers to be placed at precise locations, the markers (m1-m6) of the present invention are not required to be placed at precise locations. Each marker can be placed at an arbitrary location. For example, in the embodiment shown in FIG. 1A, the marker 1 (m1) is placed at an arbitrary location near the camera 6 (c6) and camera 1 (c1). Similarly, the marker 2 (m2) is placed at an arbitrary location near the camera 1 (c1) and the camera 2 (c2). Likewise, the remaining markers (m3, m4, m5, m6) each are placed at an arbitrary location near the corresponding cameras.

In the embodiment shown in FIG. 1A, the markers (m1-m6) are arranged around the vehicle 14 such that each camera has two markers within its field of view (FOV), i.e., two markers being visible in each camera. Specifically, the camera 1 (c1) has the marker 1 (m1) and the marker 2 (m2) within its FOV. The camera 2 (c2) has the marker 2 (m2) and the marker 3 (m3) within its FOV. In the same fashion, the remaining cameras (c3, c4, c5, c6) each have two corresponding markers (m3 and m4, m4 and m5, m5 and m6, m6 and m1), respectively, within their FOVs. However, the markers' arrangement during the calibration process of the present invention is not limited to the arrangement shown in FIG. 1A. In other embodiments, one or more cameras may have three or more markers within its FOV. Alternatively, one or more cameras may have only one marker within its FOV. Preferably, each camera has at least one marker within its FOV.

In another embodiment of the present invention, one or more markers may be placed within a predetermined range from the vehicle 14 or a camera. This range may be determined in consideration of e.g., cameras' arrangement, the number of cameras, each camera's FOV, dimensions of the vehicle 14, the range of wireless communication, requirements from the surround-view camera system 12, and/or other requirements from the calibration apparatus 10, etc. For example, a marker may be required to be placed at an arbitrary location within 5 meters from the vehicle in some instances.

Figure 2B:
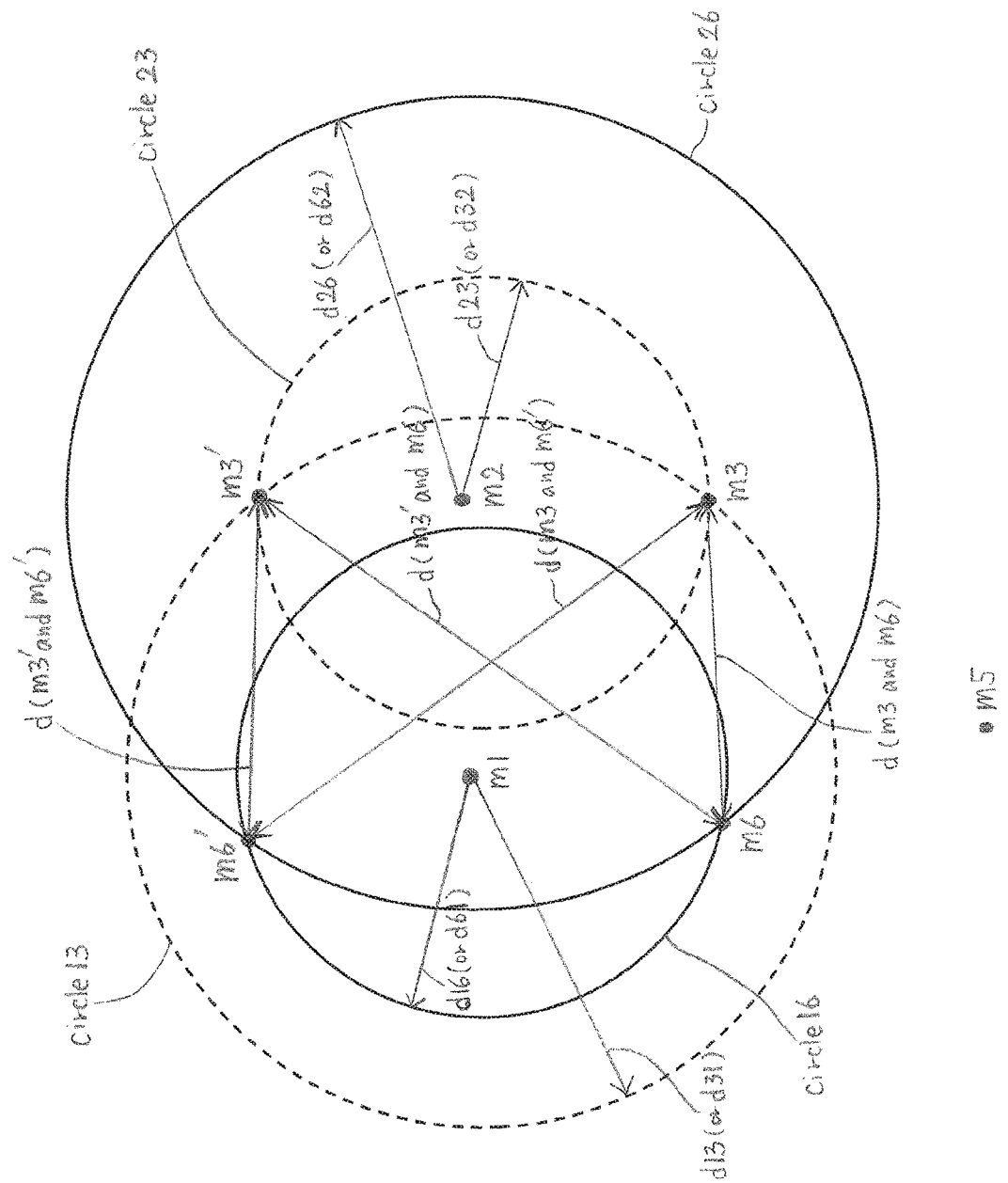
FIG. 2B is a schematic view of the calibration apparatus illustrating how the actual location of a marker is determined.

FIG. 2A is a plan view illustrating a coordinate system 22 defined by the calibration apparatus 10. Specifically, a box 20 with dotted lines indicates a region visible to the camera 1 (c1). The image of the region 20 captured by the camera 1 (c1) includes the marker 1 (m1) and the marker 2 (m2). The marker 1 (or the first marker) defines the origin of the coordinate system 22. Preferably, the center location of the marker 1 (m1) is the origin of the coordinate system 22. The marker 2 (or the second marker) defines an X-axis of the coordinate system 22. Specifically, the line connecting the marker 1 (m1) with the marker 2 (m2) becomes an X-axis of the coordinate system 22. Thus, the center location of the marker 2 (m2) is placed on the X-axis. Once the origin and the X-axis are defined, a Y-axis which passes the origin and is perpendicular to the X-axis, can be easily defined, as shown in FIG. 2A. Accordingly, the ECU 16 defines the coordinate system 22 based on the visually detected marker 1 (m1) and marker 2 (m2) from the image taken by the camera 1 (c1). Here, the camera 1 (c1) functions as a coordinate-defining camera. In this embodiment, the coordinate system 22 is preferably a two-dimensional coordinate system. The process of visual detection of a marker will be explained later.

As mentioned earlier, in a preferred embodiment, all of the markers (m1-m6) are configured to measure distances between one another (e.g., using a laser rangefinder). Thus, the marker 1 (m1) is configured to measure the distance (d12) between the marker 1 (m1) and the marker 2 (m2). The marker 2 (m2) is configured to measure the distance (d21) between the marker 2 (m2) and the marker 1 (m1). However, in other embodiments, not all of the markers (m1-m6) may be configured to measure distances between one another. For example, while the marker 1 (m1) may be configured to measure the distance relative to the marker 2 (m2), the marker 2 may not be configured to measure the distance relative to the marker 1 (m1).

As shown in FIG. 2A, the marker 6 (m6) is outside the field of view of the camera 1 (c1) (i.e., the marker 6 being disposed outside the box 20). However, as described above, the marker 6 (m6) is configured to measure the distance (d61) between the marker 6 (m6) and the marker 1 (m1), and the distance (d62) between the marker 6 (m6) and the marker 2 (m2). Similarly, the marker 1 (m1) is configured to measure the distance (d16) between the marker 1 (m1) and the marker 6 (m6), and the marker 2 (m2) is configured to measure the distance (d26) between the marker 2 (m2) and the marker 6 (m6). Any pair of distances between two markers (e.g., d16 and d61) is preferably compared to one another to verify consistent measurements within an acceptable tolerance.

As two distances (d16 (or d61) and d26 (or d62)) are known, the location (or coordinate) of the marker 6 (m6) in the coordinate system 22 can be determined. Specifically, the location of the marker 6 (m6) is determined to be an intersection between circle16 (i.e., a circle having its origin at the marker 1 (m1) and a radius of d16 (or d61)) and circle 26 (i.e., a circle having its origin at the marker 2 (m2) and a radius of d26 (or d62)). As shown in FIG. 2A, there are two intersections (as indicated by m6 and m6') between circle 16 and circle 26, i.e., two possible locations of the marker 6. Determining which one is the actual location of the marker 6 can be conducted in various ways. For example, the marker 6 may be required to be placed on the negative side of Y-axis of the coordinate system 22. Adding such restriction would remove the other intersection (i.e., m6') from the possible choices. Alternatively, each marker may be assigned to a certain region of the area G. For example, in FIG. 1A, the marker 6 is approximately placed (or assigned) to a region that is longitudinally in the middle and laterally on the left side of the area G. A candidate location that does not meet such a regional restriction may be safely removed from the possible choices. For another example, any candidate location that is outside the area G can also be removed from the possible choices.

However, in other embodiments, the constraints described above may not be needed to determine the actual location of a marker among the candidate locations. Referring back to FIG. 1A, in a preferred embodiment, all of the markers (m1-m6) are configured to measure distances between one another. As the two candidate locations (m6 and m6') for the marker 6 are determined using circle 16 and circle 26 (shown as solid-line circles in FIGS. 2A and 2B), the two candidate locations (m3 and m3') for the marker 3 can be determined in a similar manner using circle 13 and circle 23 (shown as dotted-line circles in FIG. 2B). Thus, a total of four possible candidate sets exist for the marker 3 and the marker 6 (i.e., (m3 and m6)/(m3 and m6')/(m3' and m6)/(m3' and m6')). As the marker 3 or the marker 6 or both are configured to measure the distance (d36 or d63) between themselves, the calculated distance (i.e., d(m3 and m6)) with only two candidate sets (i.e., (m3 and m6)/(m3' and m6')) likely matches the measured distance (d36 or d63) among the four calculated distances (i.e., d(m3 and m6)/d(m3 and m6')/d(m3' and m6)/d(m3' and m6')) illustrated in FIG. 2B. Further, as the distance (d56 (or d65)) between the marker 5 (m5) and the marker 6 (m6), and the distance (d35 (or d53)) between the marker 3 (m3) and the marker 5 (m5) are measured (not shown in FIG. 2B), the remaining candidate set (i.e., (m3' and m6')) for the marker 3 and the marker 6 can also be removed from the possible choices. In this way, the accurate marker location among the possible candidate locations can be determined by process of elimination using the measured distances between markers. The above-described process may be repeated for at least some of other pairs of markers (i.e., (m3 and m4), (m3 and m5), (m4 and m5), (m4 and m6), (m5 and m6)) until the actual location for all markers (m1-m6) is obtained. Once this process is complete, the final location of each marker may be determined (or calculated) by, for example, averaging a plurality of values acquired in the above-described process for each marker to minimize positional errors resulting from variances in distances measured by individual markers.

In some embodiments, a plurality of markers form a grid (or lattice) on the ground G, where each marker functions as a grid point. In other words, a plurality of markers operate as a grid device. For example, in the embodiment shown in FIG. 1A, six markers (m1-m6), as a grid device, form a grid (or lattice) on the ground G, which generates grid information (e.g., x and y coordinates for six markers (m1-m6) in the coordinate system 22).

Figure 3A:
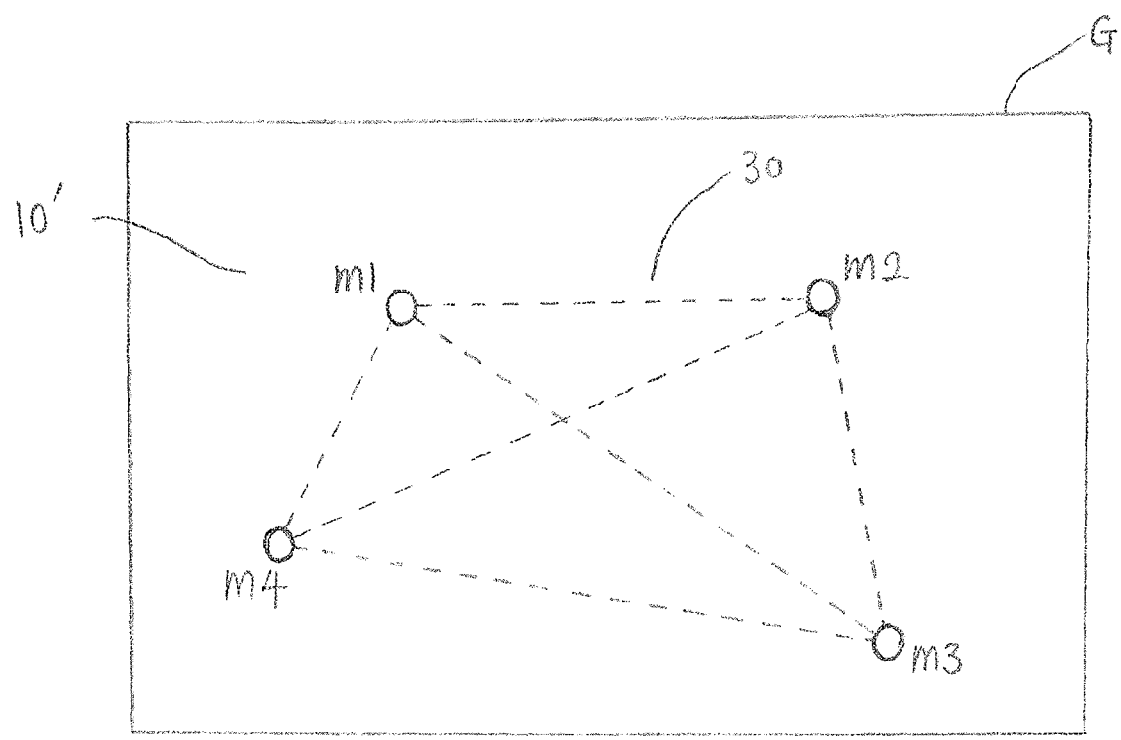
FIG. 3A is a schematic illustration of an alternative calibration apparatus including four markers.

FIG. 3A schematically illustrates an alternative embodiment in which a calibration apparatus 10' includes four markers (m1-m4), which is less than the six markers (m1-m6) shown in FIG. 1A. Such a four-marker calibration apparatus 10' may be used for calibrating a surround-view camera system mounted on an object (not shown) such as, e.g., a passenger car. Four markers (m1-m4) are placed in an area G while forming an approximately rectangular-shaped grid 30.

Generally speaking, by adding more grid points (or markers) to the grid device, more "certainty" or "rigidity" is added to the grid. For example, the location of the fourth marker or fourth grid point (i.e., m3 in FIGS. 3A and 3B) may be determined based on the other three markers (i.e., m1, m2, m4). As shown in FIG. 3B, three circles (i.e., circle 13, circle 23, circle 43) can be formed by three sets of markers (i.e., (m1 and m3), (m2 and m3), (m4 and m3)) and measured distances between themselves (i.e., d13 (or d31), d23 (or d32), d43 (or d34)). Thus, the location of the fourth marker (i.e., m3) may be determined as the point where the three circles (i.e., circle 13, circle 23, circle 43) intersect with one another.

In a manner similar to that described above, the final location of each marker may be determined (or calculated) by, for example, averaging a plurality of values acquired in the above-described process for each marker to minimize positional errors resulting from variances in distances measured by individual markers. Generally speaking, the error associated with the average of three values is $$\frac{1}{\sqrt{3}} (\approx 0.57)$$

of the initial value, thus approximately half of what it was with the initial value. Thus, by adding more grid points (or markers) to the grid 30, more "certainty" or "rigidity" is added to the grid 30.

The uncertainty (or error) associated with finding the accurate location of a marker can be represented as $$\frac{1}{\sqrt{\frac{(N-1)!}{(2*(N-3)!)}}},$$

or 0.57, 0.41, 0.32 for 4, 5, 6 markers, respectively, where N is the total number of markers (or grid points) in a grid. As all six distances between the four markers (m1-m4) shown in FIG. 3A are obtained, the grid structure becomes "rigid." This fully triangulated arrangement can be propagated throughout a grid having more markers, thereby creating a more rigid lattice of marker locations.

In another embodiment of the present invention, one or more markers may function as a master marker relative to other markers (or slave markers). For example, in the embodiment shown in FIG. 1A, the marker 1 (m1) may function as a master marker relative other markers (or slave markers (m2-m6)). Once each slave marker (m2-m6) measures one or more distances relative to other markers, each slave marker may communicate its data to the master marker (m1). When the master marker (m1) completes receiving the data from all slave markers (m2-m6), it then communicates the received data with the ECU 16.

According to one variant embodiment, markers may have a hierarchy set among them (e.g., m1, then m2, then m3 . . . etc.). Thus, each slave marker (m2-m6) may communicate with the master marker (m1) or the ECU 16 in the order as defined in the hierarchy. For example, each slave marker (m2-m6) may directly communicate with the master marker (m1) or by "daisy-chain" (serial) data transfer via other markers.

In an embodiment, the master marker (m1) may perform a data cleanup process before communicating the data with the ECU 16. For example, the distance measurement data by the master marker or slave markers may include a certain noise signal (e.g., distance measurement data based on a light pulse reflected from an object other than other markers). The master marker (m1) may first remove such noise signals using, e.g., a pre-programmed routine. Such a routine may remove, for example, i) distances that are out of range with a particular area (G) in which the markers are deployed, and ii) distances that are non-duplicates indicating that two markers have not both measured the same distance between one another, or not within allowable distance difference tolerances (e.g., distances d12≠d21 within a predefined distance difference tolerance), etc.

The markers' configuration of the present invention is not limited to the master-slave configuration described above. In other embodiments, all or some of the markers may be configured to communicate data directly with the ECU 16. Further, the data cleanup process may be performed by an individual marker or the ECU 16 instead of the master marker.

In a preferred embodiment, a group of markers (or a grid device) autonomously measure a grid (i.e., a self-measuring grid). That is, when a group of markers are placed in an area and activated, all of the markers autonomously measure the distances between one another, save, and communicate the data with one another or the ECU 16. Since the grid measuring process is performed without human intervention, this process removes a source of human errors. Activation of the markers may be carried out either electronically or manually at each of the markers, the master marker, the ECU 16 or any combination of thereof.

Figure 4A:
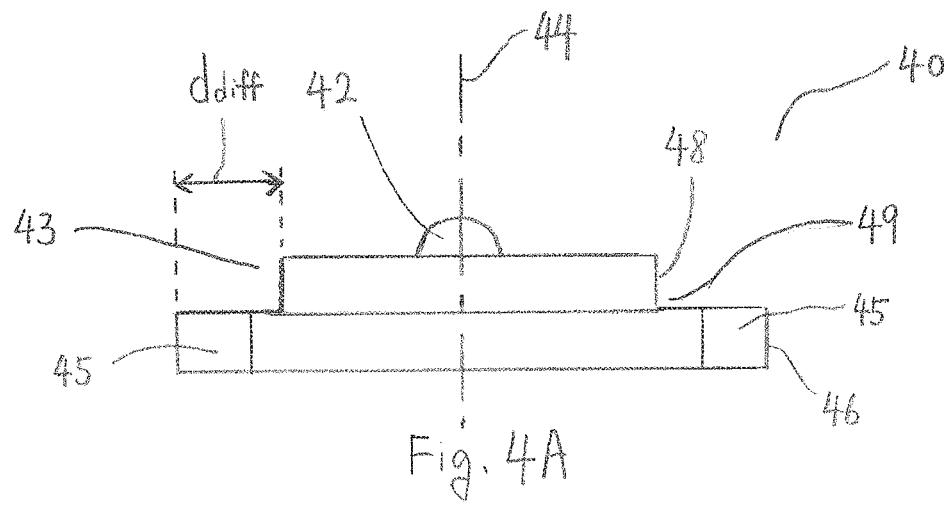
FIGS. 4A-4B are views of a marker in accordance with an embodiment of the present application.
Figure 4B:
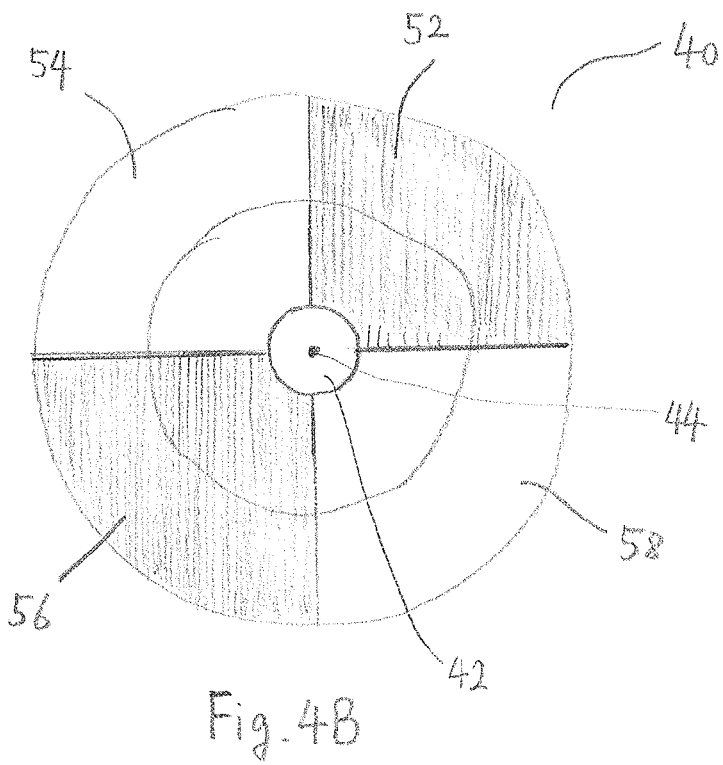

Markers preferably have vertically low and radially symmetrical construction. In one embodiment, markers may be slightly downwardly sloped in the radially outward direction. This downward slope allows for a small degree of non-flatness in the plane on which the markers are placed. In another embodiment, markers may be a cylindrically-shaped puck-like object. FIGS. 4A-4B are a side view and a top view of an exemplary marker 40, respectively, in accordance with an embodiment of the present application. As described above, markers of the present invention function as rangefinders that are each capable of measuring a distance between itself and its target (e.g., a marker having a built-in rangefinder). In this embodiment, the marker 40 includes a ranging diode 42 that emits a light pulse to a target. The ranging diode 42 may be, for example, a light-emitting diode (LED) or a laser diode (LD). The marker (or the rangefinder) 40 may also include a receiver circuit section 45 for detecting a reflection of the light pulse from the target, and a ranging circuit section for calculating a distance from the ranging device to the target. The ranging diode 42 may also be equipped to wirelessly transmit or receive data. The marker 40 may include a storage device where data are saved and/or include a processor to process such data. Various types of rangefinders are known to those skilled in the art, and thus detailed descriptions are omitted for brevity.

The marker 40 includes a body 43. The body 43 preferably has one or more reflective surfaces (or edges) 46, 48 that reflect the light pulse(s) received from a light-emitting marker back to that marker. The reflective surfaces 46, 48 may be formed with, e.g., a reflective material, a reflective sheet, a reflective coating, etc. The body 43 is preferably cylindrically shaped (or round-shaped). However, in other embodiments, the body 43 may have a different shape such as triangular, rectangular, hexagonal, etc.

The body 43 shown in FIGS. 4A and 4B includes a stepped portion 49 such that the body 43 provides reflective surfaces 46, 48 having two different radii relative to the center line 44 (i.e., dual distance construction). The difference in distance, $d_{diff}$ (i.e., difference between two radii) with the marker 40 can be used to identify the marker 40. For example, when another marker emits a light pulse towards the marker 40 to measure a distance therebetween, the marker 40 will reflect the light pulse back to the light-emitting marker from the two different reflective surfaces 46, 48. Thus, the light-emitting marker will measure two different distances ($d_{1st}$, $d_{2nd}$) based on the reflected lights, where $d_{diff}$ is equal to $|d_{1st}-d_{2nd}|$. As $d_{diff}$ can be set to a predetermined value and uniquely assigned to a certain marker (i.e., marker 40 here), the light-emitting marker can determine the identity of the light-reflecting marker based on two different distances ($d_{1st}$, $d_{2nd}$) measured.

According to one embodiment, distance measurement may be performed in a sequential manner to avoid confusion among markers. For example, distance measurement between markers may be performed according to a hierarchy set among them (e.g., m1, then m2, then m3 . . . etc.). Thus, until the first marker (m1) completes its distance measurement by receiving all of the anticipated reflected signals (e.g., all of anticipated $d_{diff}$) from other markers, the remaining markers (m2, m3 . . . etc.) are on hold. Once the first marker (m1) confirms its completion of distance measurement, the subsequent marker (m2) proceeds to its distance measurement.

In another embodiment, the above-described dual distance construction is used for determining whether a certain light pulse received by a light-emitting marker is a light pulse reflected by a targeted marker(s) or merely an unwanted reflection (or noise) by an object nearby. Such unwanted reflections may be created by, e.g., a ground-level object such as a fire-hydrant. Accordingly, when a received light pulse fails to produce an anticipated $d_{diff}$, the light-emitting marker (or master marker or the ECU 16) may determine that the received light pulse is a noise signal. That is, the dual distance construction (or multi-distance construction in general) can be used for noise filtering purposes.

In a further embodiment, one or more markers include at least one visually distinctive characteristic such that the ECU 16 is configured to visually identify a marker of interest from the image (or view) taken by a camera. The visually distinctive characteristics may include, but be not limited to, e.g., shape, color, texture, size, pattern, reflectivity, or any combination of thereof. A geometry detection method (e.g., Hough transform method) may be used to detect (or identify) a line, circle, rectangle or other geometry in the image. Preferably, each visually distinctive characteristic is uniquely associated with a corresponding marker.

FIG. 4B is a top view of the marker 40, which illustrates a visually distinctive characteristic. The circularly-shaped body 43 (when viewed from top) has four quadrants 52/54/56/58. Among four quadrants, only two quadrants (i.e., 52, 56) are colored. These two quadrants may be colored with the same or different color. When the marker 40 is viewed from a camera in the distance, such a simple but visually distinctive characteristic is readily discernible such that the marker 40 can be easily identified by the ECU 16. In some embodiments, a marker or a portion of a marker may be pivotably or tiltably adjustable such that the visually distinctive characteristic is readily observable from a camera(s) when the marker is positioned appropriately.

Figure 5A:
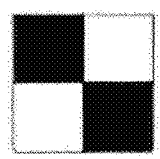
FIGS. 5A-5J are shapes that can be used as at least a portion of a visually distinctive characteristic.
Figure 5F:
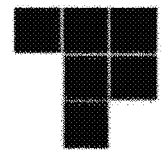
Figure 5B:
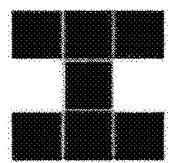
Figure 5G:
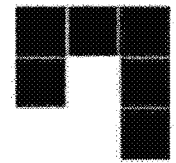
Figure 5C:
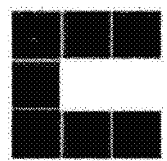
Figure 5H:
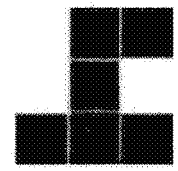
Figure 5D:
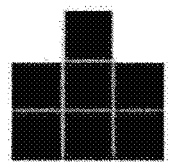
Figure 5I:
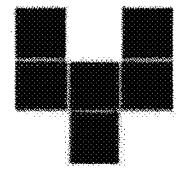
Figure 5E:
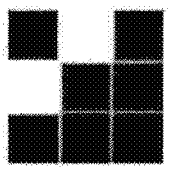
Figure 5J:
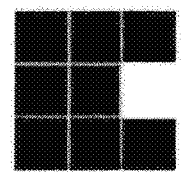

In another embodiment, a marker may have an easily identifiable visual pattern (or a visually distinctive characteristic) that can be localized to sub-pixel accuracy by image processing. FIGS. 5A-5J show shapes that can be used as at least a portion of such a visual pattern. For example, FIG. 5A shows a two-by-two checkerboard shape. The center location of the two-by-two checkerboard shape can be determined using diagonally opposing corner points or mutually opposing mid-points during image processing. For another example, FIG. 5B shows an H-shape. The center location of the H-shape can be determined using multiple sets of diagonally opposing corner points during image processing. The final value of the center location may be determined by averaging multiple values obtained from multiple sets of corner points, thereby increasing accuracy. In this way, the location (e.g., center location) of a marker of interest can be easily detected from the image taken by a camera.

Figure 6A:
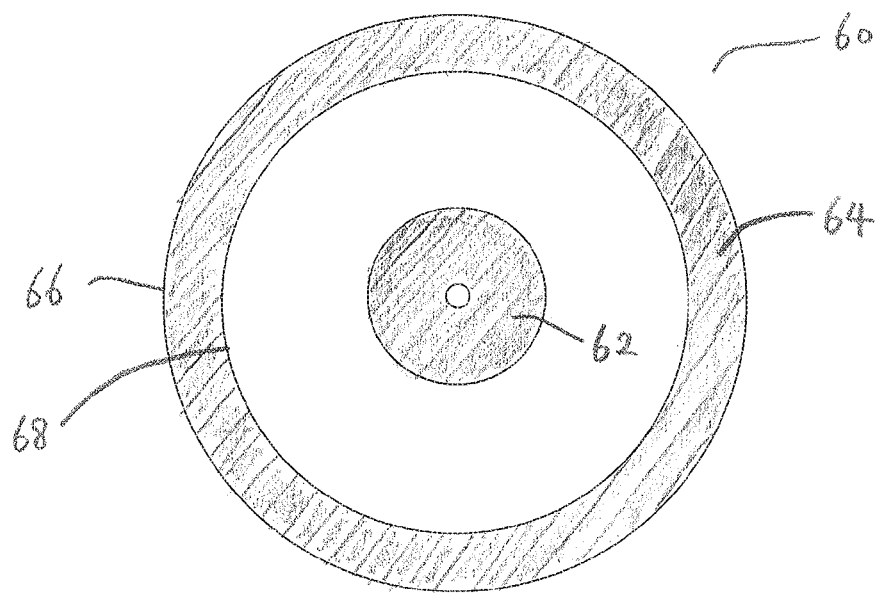
FIGS. 6A-6B are views of concentric ring(s) as another example of a visually distinctive characteristic.
Figure 6B:
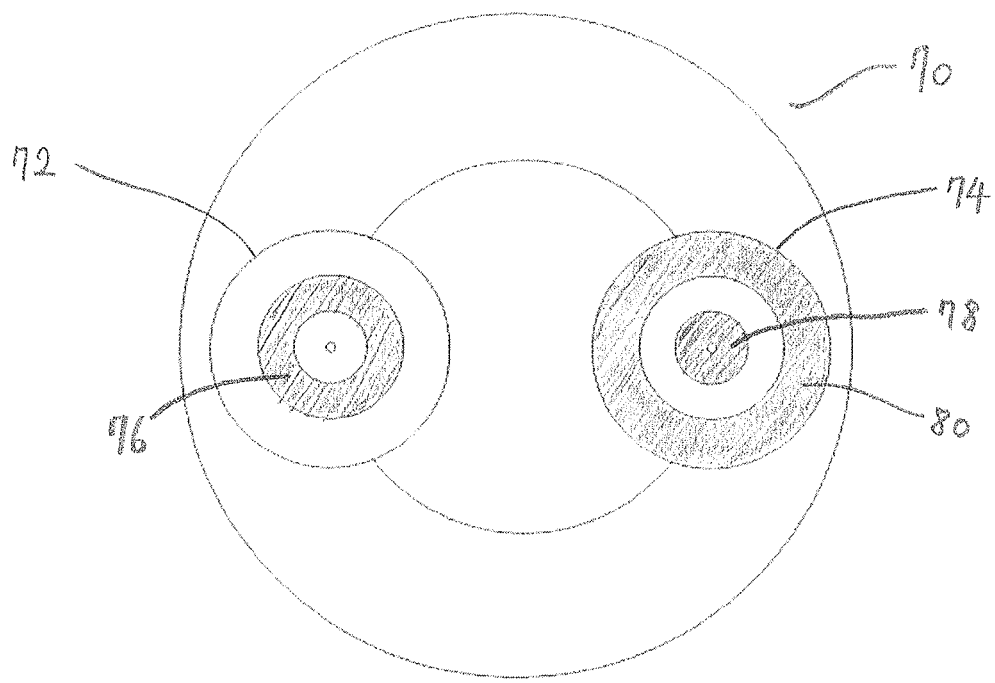

FIGS. 6A-6B are views of concentric ring(s) as another example of a visually distinctive characteristic. FIG. 6A shows a marker 60 having a concentric ring pattern. The marker 60 has an inner portion 62 and an outer portion 64. In an embodiment, the inner and outer portions 62, 64 may be colored with different colors (e.g., the inner portion 62 colored with red and the outer portion 64 colored with blue). This concentric ring pattern combined with a unique color combination provides a visually distinctive characteristic for the marker 60. In addition, various color-coded markings (e.g., various color combinations for the inner and outer portions 62, 64, such as red/blue, black/red, blue/black, etc.) can provide a unique identity to each corresponding marker.

In some embodiments, the marker 60 may have two reflective surfaces (or reflective lips) 66, 68 having a different radius relative to the center of the marker 60 to provide a dual distance construction. For example, the inner reflective surface (or inner reflective lip) 68 may be elevated higher than the outer reflective surface (or outer reflective lip) 66 such that the marker 60 provides two reflective surfaces.

FIG. 6B shows a variant of the concentric ring pattern. Specifically, a concentric dual-ring pattern is shown on a marker 70. The marker 70 has a first concentric ring 72 on the left and a second concentric ring 74 on the right. As shown in FIG. 6B, the two rings 72, 74 have a different polarity (i.e., only the middle portion 76 is colored with the first ring 72, whereas the inner portion 78 and the outer portion 80 are colored with the second ring 74). In total, three pairs of different concentric dual-ring patterns can be constructed with these two polarities. Further, in some embodiments, a different color may be used for a different portion 76, 78, 80 of the ring such that various color-coded markings can provide a unique identity to each corresponding marker.

A visually distinctive characteristic (e.g., an H-shape) of a marker is preferably located at the center of the marker such that the ECU 16 directly detects the center location of the marker from the image taken by a camera. However, in other embodiments, a visually distinctive characteristic (e.g., an H-shape) of a marker may be located at a location spaced apart from the center by a predetermined distance. The ECU 16 can make corrections based on the predetermined distance to determine the center location of the marker. In some embodiments, one or more additional markings may be provided to indicate the direction in which the center location of the marker lies relative to e.g., the H-shape. For example, in the above-discussed concentric ring pattern shown in FIG. 6B, a black bar containing the marker center may connect the dual concentric ring patterns.

In other embodiments, the ECU 16 may identify one or more markers in a non-visual manner. For example, the identity of one or more markers may be inputted manually. Alternatively, each marker may electronically signal its identity when the ECU 16 requests. Further, in such a case, while the ECU 16 determines the identity of the marker in a non-visual manner, the ECU 16 may still detect the center (or other marked location) of the marker from the camera image via, e.g., a simple red dot at the center of the marker (i.e., the ECU 16 still visually identifies at least the center of the marker). Thus, in the present application, the term "visually identifying" or "visually detecting" encompasses visually determining the identity of a marker and/or visually locating a certain area (e.g., a center of a marker) from an image (or view) of a camera.

In a further embodiment, when a marker communicates with another marker or the ECU 16, the marker may include a unique identification code (e.g., Morse code identifier, frequency identifier, etc.) that is uniquely assigned to each marker. For example, when a marker transmits data (e.g., measured distance), it may begin and end data communication with its unique identification code. In this way, other markers or the ECU 16 can identify which marker is communicating certain data and/or when the communication begins and ends.

According to a preferred embodiment, the ECU 16 is configured to visually identify a marker of interest from the image taken by a camera via a visually distinctive characteristic (e.g., an H-shape) of the marker. In addition, data communication from the same marker is accompanied by a unique identification code (e.g., a Morse code identifier). In this way, the ECU 16 can automatically associate the image data (e.g., a visually identified marker from the image) with the grid information (e.g., identified x and y coordinates of the same marker) without human intervention. In this way, a potential association error is prevented.

FIG. 7 is a schematic illustration of a calibration process using a calibration apparatus 110 in accordance with an embodiment of the present application. To calibrate a camera system 112 (e.g., a surround-view camera system) mounted on an object (e.g., a passenger vehicle; not shown here), the object is placed on the ground G. An ECU 116 may be mounted on the (not shown) object. For the sake of convenience of description, the camera system 112 shown in FIG. 7 is assumed to be a surround-view camera system. The surround-view camera system 112 includes a total of four cameras (c101-c104). The calibration apparatus 110 includes a total of four markers (m101-m104) and an ECU 116. Each camera has two markers within its field of view (FOV). Specifically, the camera 1 (c101) has the marker 1 (m101) and the marker 2 (m102) within its FOV. The camera 2 (c102) has the marker 2 (m102) and the marker 3 (m103) within its FOV. In the same fashion, the remaining cameras (c103, c104) each have two corresponding markers (m103 and m104; m104 and m101), respectively, within their FOVs. Thus, four markers (m101-m104) form a grid 130. However, it should again be noted that the number of cameras and/or markers can vary without departing from the scope of the present invention.

Figure 8:
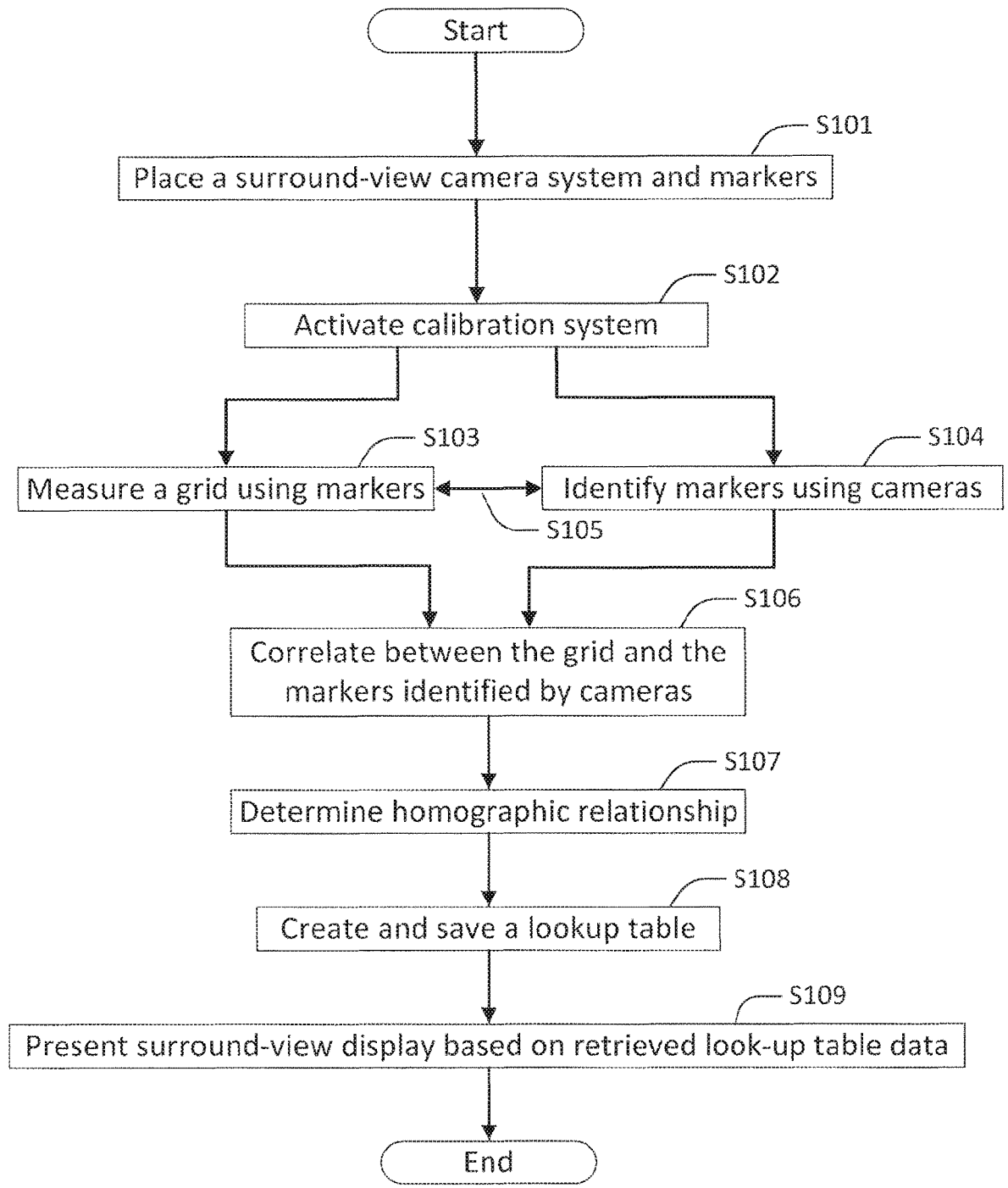
FIG. 8 is a flow chart that shows a calibration process in a simplified way in accordance with an embodiment of the present invention.

Next, the calibration process is explained in reference to FIGS. 7-8. FIG. 8 is a flow chart that shows a calibration process in a simplified way. When the calibration process is started, first, the surround-view camera system 112 and the markers (m101-m104) are placed within the boundary of the area G, as illustrated in FIG. 7 (step S101). As described above, unlike conventional calibration systems, the markers of the present invention are not required to be placed at precise locations. Each marker (m101-m104) can be placed at an arbitrary location as long as each marker is within its corresponding camera's FOV. For example, the marker 1 (m101) can be placed at an arbitrary location as long as the marker 1 (m101) is within the FOV of the camera 1 (c101) and the camera 4 (c104).

Once the surround-view camera system 112 (or cameras (c101-c104)) and the markers (m101-m104) are appropriately placed in the area G, the calibration system is activated (step S102), e.g., turning on and/or initializing the markers (m101-m104), cameras (c101-c104) and/or the ECU 116, etc. Activation of the calibration system may be carried out either electronically or manually or by way of any combination of thereof.

Initialization of the markers (m101-m104) may include, but is not limited to, confirming each marker's proper functionality (e.g., capability to send and receive a signal), data communicability with the ECU 116 and between the markers (m101-m104), and/or duplication of the measured distances (e.g., d12=d21) or being within allowable tolerances, etc. If the calibration system fails to pass the activation process (e.g., a certain marker's failure to communicate with the ECU 116), the ECU 116 may generate an activation failure message and end the calibration process (not shown).

Upon successful activation, the grid device (i.e., markers) starts measuring the grid 130 formed by a plurality of markers (m101-m104) (step S103). As described above, all of the markers (m101-m104) are configured to measure distances between one another (e.g., using a laser rangefinder). Thus, in the present illustration shown in FIG. 7, each marker is configured to measure three distances. Specifically, the marker 1 (m101) is configured to measure the distance (d12) between the marker 1 (m101) and the marker 2 (m102), the distance (d13) between the marker 1 (m101) and the marker 3 (m103), and the distance (d14) between the marker 1 (m101) and the marker 4 (m104). Similarly, the marker 2 (m102), marker 3 (m103), and marker 4 (m104) each are configured to measure three distances (d21/d23/d24, d31/d32/d34, d41/d42/d43), respectively. Each marker saves measured distances in its storage device (e.g., a memory).

Preferably, each marker has a dual distance construction, as described above in reference to FIGS. 4A and 4B. Thus, each marker can determine the identity of the light-reflecting marker and associate a certain measured distance with the light-reflecting marker. The distance measurement between two markers may be conducted multiple times and the final distance value may be determined by averaging those measured values, which improves accuracy. Further, in some embodiments, the final distance value between two markers may be an average value of two distances measured by two markers (e.g., distance between the marker 1 (m101) and the marker 2 (m102)=(d12+d21)/2).

Once distances between markers are determined, such data may be communicated to the ECU 116 via a communication network 132, which may be one of wireless, wired, manual communication, and any combination thereof, as explained above. The ECU 116 then generates grid information for the grid 130. Specifically, a grid generation module 152 of the ECU 116 generates grid information (e.g., x and y coordinates for four markers (m101-m104) in a coordinate system 122) in the area G, as shown in FIG. 7. As explained above, the marker 1 (m101) defines the origin of the coordinate system 122. Specifically, the center location of the marker 1 (m101) is preferably the origin of the coordinate system 122. The marker 2 (m102) defines an X-axis of the coordinate system 122. Preferably, the center location of the marker 2 (m102) is placed on the X-axis. Once the origin and the X-axis are defined, a Y-axis which passes through the origin and is perpendicular to the X-axis can be easily defined, as shown in FIG. 7. While the origin of the coordinate system 122 is preferably placed at the center of the marker 1 (m101), it may be placed at the center of other markers (m102, m103, m104) or at other location (e.g., a mid-point between two markers) in other embodiments.

To calculate x and y coordinates for the four markers (m101-m104) in the coordinate system 122, the grid generation module 152 may include a routine that calculates x and y coordinates of the markers based on the geometric relationship of two intersecting circles, as described above in reference to FIG. 2A. As explained, among the possible candidate locations of a marker, the final marker location (e.g., x and y coordinates of the marker) may be determined, for example, by process of elimination using the measured distances between the markers.

In parallel with, before, or after the measurement of the grid in step S103, after the calibration apparatus 110 is successfully activated, a marker identification module 154 of the ECU 116 identifies each marker (m101-m104) in the image(s) (or view(s)) captured by one or more cameras (step S104). Preferably, the marker identification module 154 identifies each marker (m101-m104) via a visually distinctive characteristic of each marker. For example, when the camera 1 (c101) captures an image of the marker 1 (m101) having an H-shape on its top surface as a visually distinctive characteristic, the marker identification module 154 detects the H-shape of the marker 1 (m101) using a pattern recognition module (or program) (not shown). The pattern recognition module may employ, e.g., the Hough transformation method. Since an H-shape is uniquely assigned only to the marker 1 (m101), the marker identification module 154 can identify the marker 1 (m101) based on the image captured by the camera 1 (c101). Further, the marker identification module 154 can locate the center of the marker 1 (m101) using the identified H-shape (e.g., the center of the marker 1 (m101) being at the center of the H-shape).

Measurement of the grid 130 in step S103 and identification of markers using cameras in step S104 may be conducted in parallel or sequentially (e.g, starting step S104 upon completion of step S103). Alternatively, step S103 and step S104 may be conducted interactively (indicated as step S105). For example, in some embodiments, when the camera 1 (c101) identifies the marker 1 (m101) and the marker 2 (m102), measurement of the grid 130 using the markers (m101-m104) may be initiated while the other cameras (c102-c104) are identifying the corresponding markers.

Once the grid 130 and the identity of the markers in the image (or view) of each camera are known, a correlation module 156 of the ECU 116 generates correlation information (step S106). The correlation information associates the grid information with the identified markers in the image from each camera. The correlation information may include, e.g., that the image from the camera 3 (c103) includes the marker 3 (m103) at the XY coordinate of (x3, y3) and the marker 4 (m104) at the XY coordinate of (x4, y4) in the coordinate system 122. Alternatively or in addition, the correlation information may include, e.g., that the XY coordinates of (x3, y3) and (x4, y4) correspond to specific pixels or cluster of pixels in a particular camera's image, such as pixel #55 (e.g., 14th row, 5th column) and pixel #124 (e.g., 37th row, 8th column) of the camera 3 (c103).

Next, based on the obtained correlation information, camera image calibration is performed. A homography module 158 determines homographic relationships among the cameras (c101-c104) (step S107). Generally speaking, homography refers to a relationship between two or more images of the same planar surface in space. This method calculates point-to-point mapping relations between the images and projects all images onto a uniform coordinate system (e.g., a bird's-eye view ground plane) according to the mapping relation. Thus, the homography module 158 may stitch all images (e.g., four images from four cameras (c101-c014)) into a 360-degree image (e.g., a bird's-eye view display) and subsequently eliminate the seams on the overlap region(s) formed in the stitching process of images by using a smoothing function. Various types of homographic methods are known in the art, and thus a detailed description thereof is omitted herein.

Once homographic relationships among the cameras (c101-c104) (or among images of the cameras (c101-c104)) are determined, such relations (i.e., calibration information) can be saved in a storage device (e.g., a memory or a hard disk) for later use (step S108). While calibration information can be saved in various forms (e.g., text file), such data are preferably saved in the form of a look-up table (LUT) 160. The LUT 160 may be regarded as a kind of mapping table defining relationships, which is obtained by mapping the coordinates of the image pixels of each camera to the coordinates of the image pixels of a display device 172 of a transformed view (i.e., a matrix relationship between a camera pixel and a display pixel)). This process of creating the LUT 160 may be repeated for various resolutions and renderings which the system may have. In this way, the LUTs 160 can include a plurality of relationships between the camera pixels and the display pixels covering the entirety of display resolutions and renderings.

The ECU 116 is in communication with the display device 172 of the bird's-eye view via the network 132. The calibration results saved in the form of the LUT 160 are retrieved in step S109 and used when the display device 172 displays the bird's-eye view information on its display to the driver. In one embodiment, when a bird's-eye view is displayed on the display of the display device 172 based on the images from the cameras (c101-c104), each pixel of a camera is mapped to a corresponding pixel of the display by simply reading the mapping information from the LUT 160. In this embodiment, a bird's eye view can be created and presented to the driver virtually without computation (i.e., by simply reading from the table).

Thus far, the calibration process in accordance with the present invention was described in a simplified way using the flow chart shown in FIG. 8. However, other embodiments are also contemplated. For example, in the description of step S103 above, the distances measured by each marker (m101-m104) are communicated directly to the ECU 116 via the communication network 132. However, as explained earlier, in other embodiments, the marker 1 (m101) may function as a master marker relative to other markers (i.e., slave markers) and each slave marker (m102-m104) may first communicate the measured distances to the master marker (m101). Further, when the master marker (m101) completes receiving the distance data from the slave markers (m102-m104), the master marker (m101) may perform a data cleanup process (e.g., removing distances that are non-duplicates) before it communicates the received data with the ECU 116.

Figure 9:
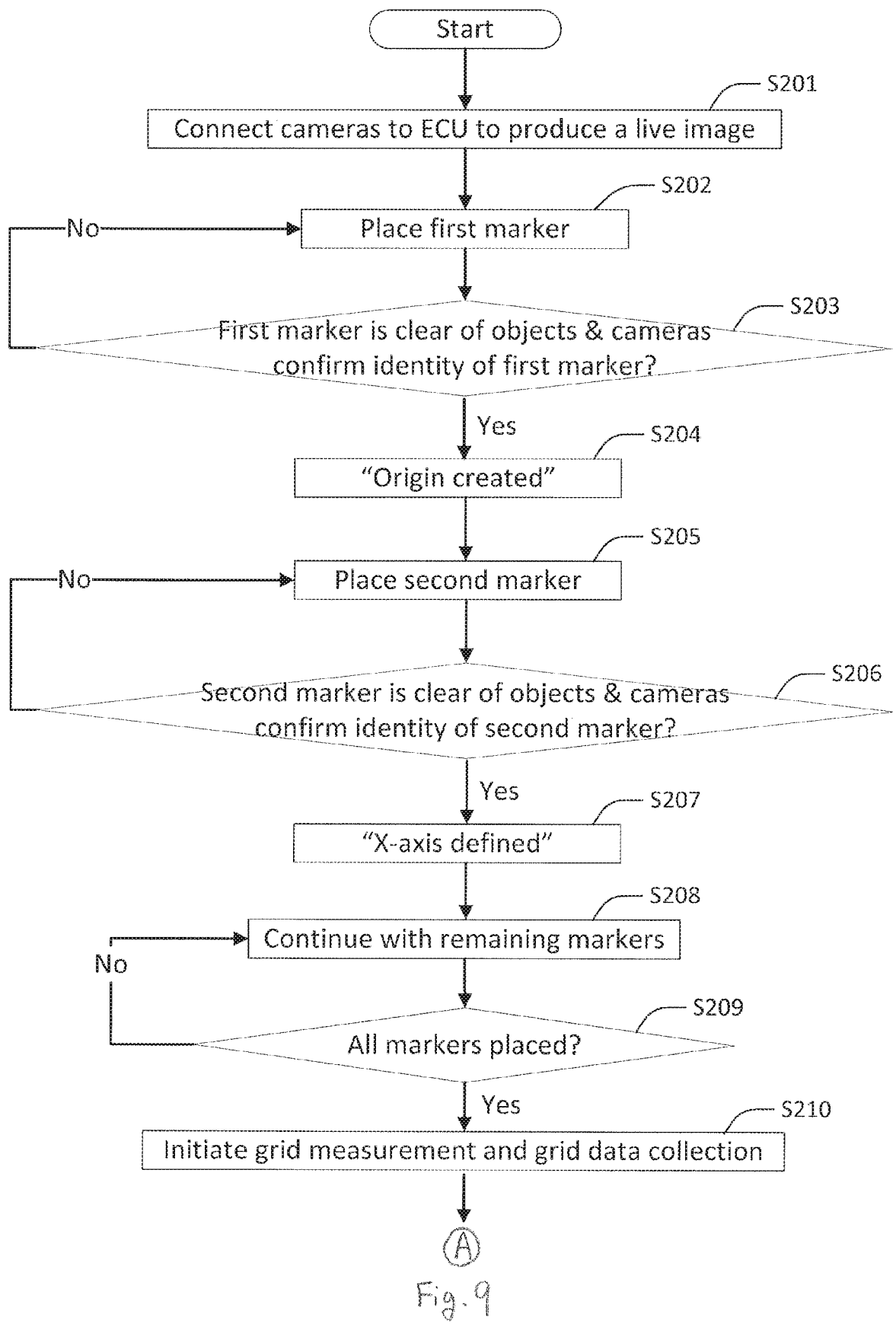

FIG. 9 is a flow chart that shows another calibration process in accordance with an embodiment of the present invention. Unlike the calibration process illustrated in FIG. 8, this embodiment illustrates a calibration process that is more interactive among the calibration apparatus 110, the camera system 112, and the ECU 116. Referring to FIGS. 7 and 9, when the calibration process is started after initialization of the system (e.g., the surround-view camera system 112 is placed within the boundary of the area G and initialization of the calibration apparatus 110, the camera system 112, and the ECU 116 is complete), the ECU 116 is connected to and in communication with the camera system 112 via the network 132 (step S201). At this point, the ECU 116 may also be connected to and in communication with the calibration apparatus 110. A live image of each camera (c101-c104) can be monitored via a display (e.g., the display of the display device 172).

Subsequently, a technician may place the first marker (or marker 1 (m101)) at an arbitrary place in the area G, which is within the FOV of the camera 1 (c101) (step S202). At this stage, the ECU 116 (or the marker identification module 154) may identify the identity of the marker 1 (m101) via, e.g., a visually distinctive characteristic (e.g., H-shape) of the marker 1 (m101) (step S203). Alternatively, the technician may simply type in the identity of the marker 1 (m101), if necessary. Also, the technician may visually confirm whether there is any object (other than other markers) near the marker 1 (m101) that could block or reflect the signals from the marker 1 (m101) (step S203). Alternatively, the marker 1 (m101) itself may send out test signals to confirm whether there is any signal-reflecting object nearby (step S203). When the marker 1 (m101) is determined to be not clear of signal-reflecting objects or the identity of the marker 1 (m101) cannot be confirmed, the process stops and goes back to step S202 (in this case, the technician may identify and remove the signal-reflecting object if needed), and repeats the process. Otherwise, the ECU 116 may generate a message "origin created" on the display, which indicates that the origin of the coordinate system 122 is generated at, e.g., the center of the marker 1 (m101) (step S204).

Then, the technician may move on to place the second marker (or marker 2 (m102)) at an arbitrary place in the area G, which is within the FOV of the camera 1 (c101) (step S205). At this stage, the ECU 116 (or the marker identification module 154) may determine the identity of the marker 2 (m102) via, e.g., a visually distinctive characteristic (e.g., T-shape) of the marker 2 (m102) (step S206). Alternatively, the technician may simply type in the identity of the marker 2 (m102), if necessary. Also, the technician may visually confirm whether there is any object (other than other markers) near the marker 2 (m102) that could block or reflect the signals from the marker 2 (m102) (step S206). Alternatively, the marker 2 (m102) itself may send out test signals to confirm whether there is any signal-reflecting object nearby (step S206). When the marker 2 (m102) is determined to be not clear of signal-reflecting objects or the identity of the marker 2 (m102) cannot be confirmed, the process stops, goes back to step S205, and repeats the process. Otherwise, the ECU 116 may generate a message "X-axis defined" on the display, which indicates that an X-axis of coordinate system 122 is defined by the origin (e.g., the center of the marker 1 (m101)) and the marker 2 (m102), preferably the center of the marker 2 (m102).

Likewise, the technician may proceed to place the remaining markers (in the present example, the marker 3 (m103) and the marker 4 (m104)) in a similar way as described above (step S208). Thus, upon confirming no extraneous objects being near the marker 3 (m103) and the identity of the marker 3 (m103), the ECU 116 may generate a message "the third marker identified." In this way, the process continues until all markers are appropriately confirmed or identified (step S209). When one or more markers are determined to be not clear of signal-reflecting objects or the identity of the markers cannot be confirmed, the process stops, goes back to step S208 and repeats the process. Otherwise, the process proceeds to initiate grid measurement and grid data collection described below with reference to FIG. 10.

The calibration process illustrated in FIG. 9 differs from that shown in FIG. 8 in that interaction among the calibration apparatus 110, the camera system 112, and the ECU 116 takes place in an earlier stage (e.g., step S203) of the calibration process compared to the process illustrated in FIG. 8. For example, until the marker 1 (m101) is identified and determined to be free of extraneous objects (this identification and determination require interaction of the calibration apparatus 110, the camera system 112, and the ECU 116), the process of FIG. 9 does not proceed to the next step with the marker 2 (m102). Further, in this embodiment, the grid measurement (this starts at step S210 shown in FIG. 10) does not start until all markers (m101-m104) are properly confirmed or identified.

FIG. 10 is a flow chart that shows a continued process subsequent to the calibration process shown in FIG. 9. In particular, the marker 1 (m101) functions as a master marker relative to other markers (i.e., slave markers) here. Each slave marker (m102-m104) follows the master marker's command(s). When the marker 1 (m101) commands to begin measurement (step S210), each slave marker (m102- m104) begins to measure distances with other markers. Since the ECU 116 has already communicated to the master marker (m101) regarding all of the identified markers (i.e., m101-m104) at step S209, the master marker's command includes information regarding a list of markers each marker is expected to measure distances with. For example, the master marker (m101) may command the marker 2 (m102) to measure distances with the marker 1 (m101), the marker 3 (m103), and the marker 4 (m104), and to report the measured distances to the master marker (m101).

According to the predetermined hierarchy (e.g., m101, then m102, then m103, then m104), the marker 1 (m101) may first start measuring distances with the other markers (i.e., m102, m103, m104) (step S211). When the marker 1 (m101) determines that it has completed measuring distances with the other three markers (m102, m103, m104) as commanded, the marker 1 (m101) may signal to the next marker in hierarchy (i.e., marker 2 (m102)) as such, and the marker 2 (m102) may start measuring distances with the other markers (i.e., m101, m103, m104) (step S212). Similarly, when the marker 2 (m102) determines that it has completed measuring distances with the other three markers (m101, m103, m104), as commanded, the marker 2 (m102) may signal to the next marker in hierarchy (i.e., marker 3 (m103)) as such, and the marker 3 (m103) may start measuring distances. This process continues until the last marker in hierarchy (i.e., m104) starts and finishes measuring distances, and reports to the master marker as such (step S213).

Subsequently, the master marker (m101) commands the slave markers (m102-m104) to report measured data (step S214). The reporting process may also take place sequentially, in the order of the predetermined hierarchy (e.g., m101, then m102, then m103, then m104) (step S215). Alternatively, the slave markers (m102-m104) may report their data to the master marker as the data becomes available, without waiting to receive a request from the master marker or for all of the other slave markers to complete their measurements. Once the reporting process is complete, the master marker (m101) transfers the collected data to the ECU 116 (step S216). Upon receiving the data, the ECU 116 performs a data cleanup process (step S217). Even though the data cleanup process is performed by the ECU 116 in the embodiment shown in FIG. 10, in other embodiments, the master marker (m101) may perform a data cleanup process, in whole or in part, before transferring the collected data to the ECU 116. As described earlier, the data cleanup process may include removing certain noise signals (e.g., distance measurement data based on the light pulse reflected from an object other than markers). For example, the ECU 116 may remove noise signals using, e.g., a pre-programmed routine. Such a routine may remove, for example, i) distances that are out of range with a particular area (G), where the calibration is performed and ii) distances that are non-duplicates or not within allowable tolerances (e.g., duplicated distances: d12=d21), etc.

Based on the cleaned-up measurement data, the grid generation 152 generates the complete grid 130 of the markers (m101-m104) (step S218). Specifically, to calculate x and y coordinates for the four markers (m101-m104) in the coordinate system 122, the grid generation module 152 may include a routine that calculates x and y coordinates of the markers based on the geometric relationship of two intersecting circles, as described above in reference to FIG. 2A.

Once the grid 130 and the identity of the markers (m101-m104) in the image (or view) of each camera (c101-c104) are known, the correlation module 156 of the ECU 116 generates correlation information (step S219). The correlation information associates the grid information with the identified markers in the image of each camera. As this step substantially corresponds to step S106 of FIG. 8, a detailed description is omitted. Subsequently, the process continues with step S107 (shown in FIG. 8). As steps S107, S108, S109 are described above in detail, an additional description is omitted here.

While the above-described embodiments referring to FIGS. 9-10 were related to a calibration process that is more interactive among the calibration apparatus 110, the camera system 112, and the ECU 116, the calibration process of the present invention is not limited to such a calibration process. For example, in an alternative embodiment, only after a plurality of markers in the area G fully form (or define) a grid by measuring distances between one another, an object (e.g., a vehicle) equipped with the camera system 112 may be placed on the ground G to visually identify the markers via one or more cameras. This process is particularly favored when there is a risk that the object could interfere with the markers' ability to measure distances therebetween.

According to the calibration apparatuses and/or calibration methods of the present invention, the markers do not need to be placed at precise locations in the area (e.g., precise (x, y, z) position of the marker in the area). Instead, the markers are arbitrarily placed around an object equipped with a surround-view camera system. Unlike conventional methods of measuring the actual ground location of the markers, which require long and painstaking labor, and are often prone to human error, but still can lead to less accurate calibration results, the innovative calibration apparatuses and/or methods of the present invention eliminate or significantly reduce this possibility for human error during the calibration process.

The area (or calibration area) G in which a plurality of markers and an object (e.g., a vehicle) having a plurality of cameras mounted thereon are to be placed, is preferably a flat ground (or a substantially flat ground within an acceptable tolerance range). However, it is contemplated that an appropriate correction is made (e.g., shifting a measured coordinate value of a marker by a correction value) when a certain portion of area G is out of the acceptable tolerance range.

In the embodiments described above, the calibration apparatus and/or calibration method of the present invention are depicted using a vehicular surround-view camera system. However, the calibration apparatus and/or calibration method of the present invention are not limited to such a vehicular surround-view camera system. The calibration apparatus and/or calibration method of the present invention is applicable to any camera calibration system (e.g., a camera system mounted on a robot) without departing from the spirit and scope of the present invention.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

What is claimed is:

1. A calibration apparatus for a surround-view camera system having a plurality of cameras mounted to an object, comprising:
   a plurality of markers configured to measure a plurality of distances between at least a first one of the plurality of markers and at least two others of the plurality of markers; and a controller configured to visually identify the first marker and at least one of the at least two other markers from at least one image from the plurality of cameras, wherein the controller is configured to generate camera calibration information based on the plurality of measured distances and positions of the visually identified markers in the at least one image, wherein the controller visually identifies the first marker and the at least one of the at least two other markers via a visually distinctive characteristic on a corresponding marker, and the visually distinctive characteristic is one of a shape, a color, a texture, a size, a pattern or a reflectivity.

2. The calibration apparatus according to claim 1, wherein the corresponding marker or a portion of the corresponding marker is capable of being pivotably or tiltably adjusted such that the visually distinctive characteristic is readily observable from at least one of the plurality of cameras.

3. The calibration apparatus according to claim 1, wherein when a marker communicates with other markers or the controller, the marker includes a unique identification code such that the other markers or the controller are(is) able to identify which marker is communicating.

4. The calibration apparatus according to claim 1, wherein the at least one of the two other markers includes a second marker, the first marker defines an origin of a coordinate system and the second marker defines a first axis of the coordinate system, and the controller calculates coordinates within the coordinate system for one or more of the plurality of markers based on the measured plurality of distances.

5. The calibration apparatus according to claim 4, wherein a center of the first marker defines the origin of the coordinate system, and a line connecting between the center of the first marker and a center of the second marker is the first axis of the coordinate system.

6. The calibration apparatus according to claim 4, wherein the plurality of markers further include a third marker, and a coordinate for the third marker in the coordinate system is calculated based on a first measured distance between the first and third markers, and a second measured distance between the second and third markers.

7. The calibration apparatus according to claim 6, wherein the coordinate for the third marker in the coordinate system is one of two intersections between a first circle and a second circle, where the first circle has its origin at a center of the first marker with its radius being the first measured distance, and the second circle has its origin at a center of the second marker with its radius being the second measured distance.

8. The calibration apparatus according to claim 7, wherein, between the two intersections, the one that meets one or more predetermined conditions is determined to be the coordinate for the third marker.

9. The calibration apparatus according to claim 7, wherein the plurality of markers further include a fourth marker, and a coordinate for the fourth marker in the coordinate system is calculated based on a third measured distance between the first and fourth markers, and a fourth measured distance between the second and fourth markers.

10. The calibration apparatus according to claim 9, wherein the coordinate for the fourth marker in the coordinate system is one of two intersections between a third circle and a fourth circle, where the third circle has its origin at a center of the first marker with its radius being the third measured distance, and the fourth circle has its origin at a center of the second marker with its radius being the fourth measured distance.

11. The calibration apparatus according to claim 10, wherein, among four sets of candidate coordinates for the third and fourth markers based on the two intersections between the first and second circles, and the two intersections between the third and fourth circles, a set of candidate coordinates whose calculated distance therebetween matches a measured distance between the third and fourth markers is determined to be coordinates for the third and fourth markers.

12. The calibration apparatus according to claim 1, wherein the plurality of markers are deployed forming a grid, where each marker functions as a grid point.

13. The calibration apparatus according to claim 1, wherein each of the plurality of markers self-measures distances relative to other markers.

14. The calibration apparatus according to claim 1, wherein a hierarchy exists for the plurality of markers, where a marker functions as a master marker with respect to the rest of markers which are slave markers.

15. The calibration apparatus according to claim 14, wherein one or more of the slave markers transmit measured distances to the master marker or to the controller in the order as defined in the hierarchy.

16. The calibration apparatus according to claim 1, wherein one or more of the plurality of markers include(s) a rangefinder that is capable of measuring a distance between itself and its target.

17. The calibration apparatus according to claim 1, wherein one or more of the plurality of markers include(s) a body having one or more reflective surfaces that reflect a light pulse.

18. The calibration apparatus according to claim 17, wherein the body includes a stepped portion such that the body provides at least two reflective surfaces having different radii relative to a center line of the body.

19. The calibration apparatus according to claim 18, wherein a differential value of the different radii is uniquely associated with a specific marker such that the differential value is used to identify the specific marker.

20. The calibration apparatus according to claim 19, wherein the specific marker reflects a received light pulse from another marker at two or more reflective surfaces such that an identity of the specific marker is determined based on the reflected light pulses from the two or more reflective surfaces.

21. The calibration apparatus according to claim 1, wherein
the generation of the camera calibration information includes the controller generating correlation information between a marker's location and a pixel of a corresponding camera based on the measured plurality of distances and the visually identified markers.

22. The calibration apparatus according to claim 21, wherein
the controller generates homographic relationships among the plurality of cameras based on the correlation information.

23. The calibration apparatus according to claim 22, wherein
the homographic relationships are saved in the form of a look-up table.

24. The calibration apparatus according to claim 23, further comprising:
a surround view display device, wherein
the display device is configured to display a continuous bird's-eye view image of at least a portion of a region around the object based on the camera calibration information and images from at least two of the plurality of cameras.

25. The calibration apparatus according to claim 24, wherein
the continuous bird's-eye view image includes a 360° view of an entire region around the object.

26. The calibration apparatus according to claim 24, wherein
the display device forms the continuous bird's-eye view image by stitching adjacent images using a homographic method.

27. A method for calibrating a surround-view camera system having a plurality of cameras mounted to an object, the method comprising the steps of:
placing a plurality of markers around the object;
measuring a plurality of distances between at least a first one of the plurality of markers and at least two others of the plurality of markers;
visually identifying the first marker and at least one of the at least two other markers from at least one image from the plurality of cameras; and
generating camera calibration information based on the plurality of measured distances and positions of the visually identified markers in the at least one image, wherein
the step of visually identifying the first marker and at least one of the at least two other markers is performed via a visually distinctive characteristic on a corresponding marker, and the visually distinctive characteristic is one of a shape, a color, a texture, a size, a pattern or a reflectivity.

28. The method according to claim 27, wherein
the step of measuring a plurality of distances is performed via a rangefinder that is capable of measuring a distance between itself and its target.

* * * * *